April 29, 1958     W. L. RINGLAND     2,832,910
INSULATION FOR AIR GAP OF UNIPOLAR GENERATOR
Filed Nov. 5, 1956     2 Sheets-Sheet 1

Inventor
William L. Ringland
by H. Edward Foord, Jr.
Attorney

April 29, 1958 W. L. RINGLAND 2,832,910
INSULATION FOR AIR GAP OF UNIPOLAR GENERATOR
Filed Nov. 5, 1956 2 Sheets-Sheet 2

Inventor
William L. Ringland
by W. Edward Burch, Jr.
Attorney

United States Patent Office
2,832,910
Patented Apr. 29, 1958

2,832,910

INSULATION FOR AIR GAP OF UNIPOLAR GENERATOR

William L. Ringland, West Allis, Wis., assignor to Allis-Chalmers Manufacturing Company, Milwaukee, Wis.

Application November 5, 1956, Serial No. 620,508

7 Claims. (Cl. 310—178)

This invention relates in general to unipolar generators, and more particularly to insulation positioned on an air gap surface of a unipolar generator having liquid metal current collectors.

Electrically conductive liquid metal, such as a sodium potassium alloy, has been found to be an effective current collector means in unipolar generators for conducting the high current generated in the rotor between the rotor and the current carrying portions of the stator and the external circuit. Generally, the liquid metal is circulated from external reservoirs by external pumps to the current collector portion of the air gap and returned for recirculation. The liquid metal is supplied to the current collector portions of the air gap through a supply duct; it is distributed around the circumference of the rotor wetting the collector portions of the surfaces of the rotor and stator for conducting current therebetween, and it is collected and returned to the external reservoirs after it has flowed a short distance axially of the air gap.

However, if there is not complete collection of the liquid metal and a small accumulation of liquid metal occurs in the noncurrent collector area of the air gap, such liquid metal may short circuit all or a portion of the generated voltage.

Insulation has heretofore been used on the stator air gap surface of unipolar generators to reduce the possibility of short circuits in the event of an accumulation of liquid metal in the air gap outside of the collector area. Insulation used heretofore on the stator air gap surface has comprised a coating or lining such as glass, rubber or varnish.

Because of the very small air gap between the rotor and stator of a unipolar generator, this prior insulation is subject to mechanical damage at the time the rotor is being positioned in the stator during assembly of the machine or whenever it is necessary to remove or install the rotor. In addition, although an alloy of sodium and potassium has very good electrical characteristics for its use as a liquid metal current collector in unipolar generators, this alloy is very active chemically and it has been found to attack prior insulations applied to the air gap surfaces of the rotor or stator. Over a period of time the chemical action causes breaks in the insulation with a resulting loss of insulation protection.

Liquid metal escaping from the current collector area and accumulating in the air gap at a break in the insulation caused either by mechanical injury or by the chemical action of the alloy, causes an electrical connection between the rotor and stator which short circuits the collectors.

According to the present invention, improved insulation means provide insulation along an air gap surface which is easily applied and which is protected at least in part from mechanical injury and from chemical deterioration due to chemical activity of the sodium potassium alloy. In addition, a plurality of breaches in the protected insulation are necessary with liquid metal accumulating in each before the rotor is short circuited to the stator.

The improved insulation of the present invention comprises a plurality of annular metal bands or rings each of which has a complete covering of a suitable electrical insulation. These insulated rings are secured in juxtaposition on the air gap surface of either the rotor or the stator except on the current collector portion thereof. The joints between adjacent annular bands are sealed in some suitable manner to present a continuous covering over the noncurrent collector portions of the air gap.

Because the metal rings are spaced axially by insulation and because there is insulation on the radially inner and outer sides of the clamping rings, this insulation arrangement forms more than one series barrier to either radial or axial short circuits, and the metal clamping band protects the inner layer of insulation from mechanical and chemical injury. By this arrangement a break must occur in the radially inner and outer layers of insulation or in the radially inner layer at two points and in the axial insulation between rings with liquid metal accumulating in the breaks before the rotor can be short circuited, and at least a portion of the insulation is protected by mechanical and chemical injury.

It is therefore an object of this invention to provide a unipolar generator having improved insulation which is easily applied on an air gap surface thereof.

Another object of this invention is to provide a unipolar generator having an improved insulation on an air gap surface thereof in which more than one series barrier is provided to electrical short circuiting by collector metal accumulated in the air gap.

Another object of this invention is to provide a unipolar generator having an improved insulation on an air gap surface thereof in which a portion of the insulation is protected from mechanical and chemical injury.

Other objects and advantages will be apparent from the following description taken in connection with the accompanying drawing, in which.

Figure 1:
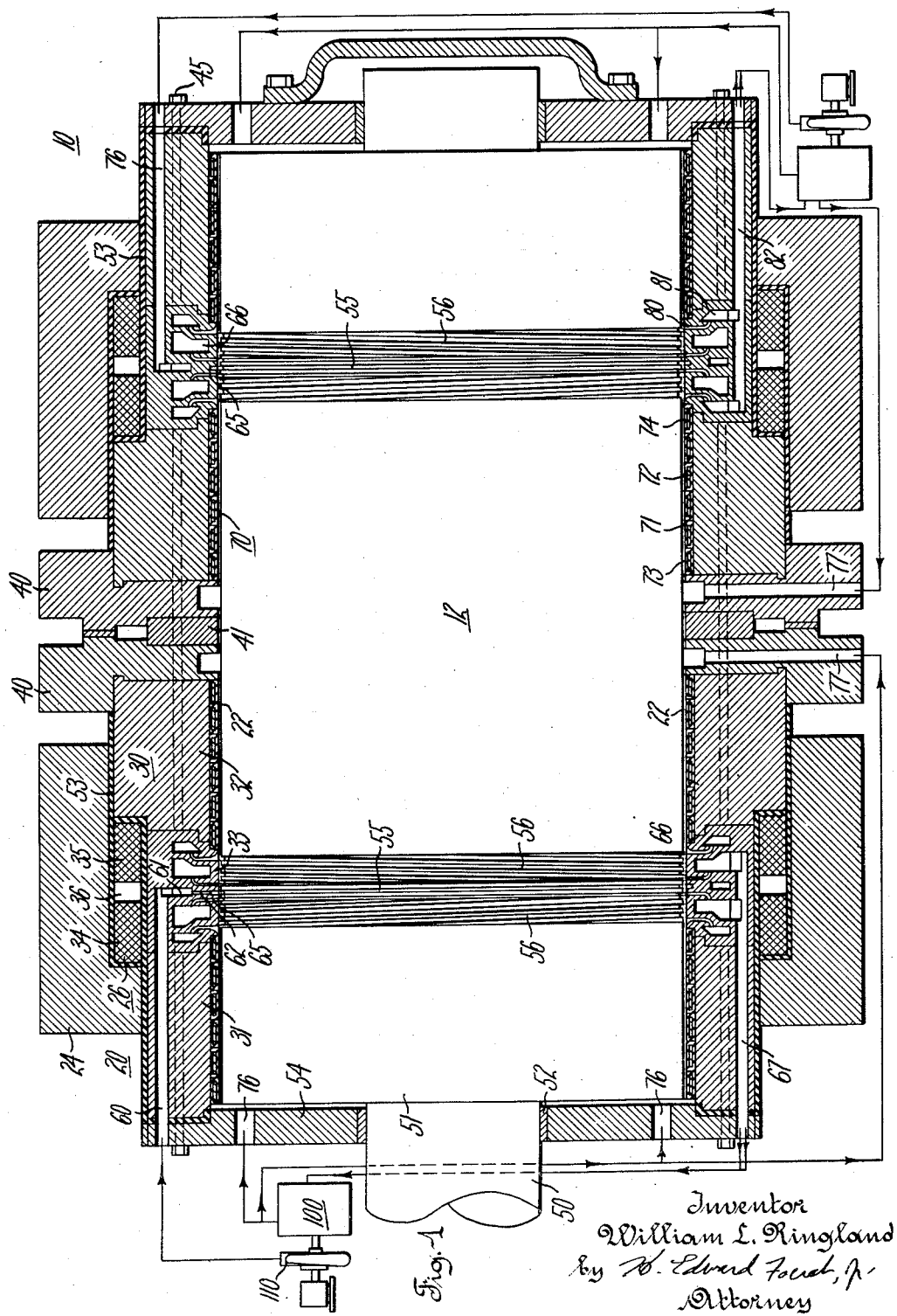
Fig. 1 is a longitudinal sectional view of a unipolar generator illustrating insulation in accordance with the present invention positioned along the air gap surface of the stator.

Referring now more particularly to the drawing, a dynamoelectric machine 10 is illustrated comprising a rotating armature member 12 and a stationary field structure 20 which cooperates with the armature to define an air gap 22 therebetween.

The field structure 20 comprises two similar units each including an annular yoke 24 having field coil 26 disposed in the recessed portion thereof, and including sleeve means 30 disposed coaxially with the yokes 24 and coils 26. The sleeve means 30 include end portions 31, 32 of magnetic material, such as iron, and an intermediate collector portion 33 which is of nonmagnetic conductive material, such as aluminum bronze. The magnetic portions 31, 32 of the sleeves serve as the poles for the field structure and are made integral with the current collector portions as by welding. Sleeve means 30 serve as current carrying members of the field structure 20 for conducting current between the armature 12 and an external circuit.

Excitation coils 26 are symmetrically located about the current collector portions 33 of the sleeves and comprise two individual coils 34, 35 with a space 36 between the coils. Constructing the coils 26 in this manner permits operation of the generator at near rated voltage even with one coil of the individual coils 34, 35 disconnected, and in addition the construction allows insertion of a probe through a suitable opening in the yoke and the collection portion of the sleeve into contact with the surface of the rotor. Such a probe may be used to measure the electrical potential at the rotor surface with the rotor turning, but before the collector area is filled with collector fluid, or it may be used as a gauge to measure clearance between the rotor and stator members. Splitting of the two elements of coils 26 further permits current lines, gas lines and liquid lines to be brought to or from the collector portion 33 of the sleeve through the space between the two coils, if desired.

Annular plates 40 integral with the adjacent ends of the sleeves 30 serve as a bus ring for the sleeves. The annular plates or bus rings 40 are spaced apart by a ring of insulation 41. The ring of insulation 41 and bus rings 40 cooperate with the two sleeves 30 in joining them as a continuous sleeve.

Long nonmagnetic bolts 45 extending through the stator 20 firmly clamp the components of the stator together. These bolts are tightened such that a relatively large amount of elongation will take place, thus providing a spring effect which will retain tightness as the machined metals age or creep. All bolt heads are readily accessible from the outside of the machine with this arrangement.

The rotatable armature or rotor 12 comprises a shaft 50 including a cylinder 51 of magnetic material such as iron for the passage of field flux therein. Although rotor 12 is shown as solid, it may of course be milled for installing copper bars for greater conductivity. Shaft 50 is supported at opposite ends of the rotor in suitable bearings 52.

Insulation 53 is provided between the yoke 24 and sleeve 30, and around the coil 26. The end plate 54 and the long bolts are also electrically insulated from the sleeves 30.

The rotor 10 has spaced apart rings 55 which are aligned radially with the current collector portions 33 of the sleeves 30. A suitable electrically conductive liquid metal, such as sodium and potassium alloy, is supplied to the current collector portion of the air gap between the rings 55 and current collector portion 33 of the sleeves 30 during operation of the generator. The rotor ring 55 and the current collector portions 33 of the sleeve are wetted by the conductive liquid metal which fills the gap therebetween. The rotor ring, the current collector portion of the sleeves and the conductive fluid serve as current collectors conducting current between the rotor 12 and the current conductive sleeves 30 of the field member.

Means are provided for cooling the collector fluid. Although the collector portion 33 of each sleeve 31 may be cooled by circulating a cooling fluid through suitable ducts therein, it is preferably cooled by circulation of the collector fluid through external coolers and returned to the current collector portions by external pumps.

The collector fluid therefore is supplied to the current collector portions of the air gap from an external reservoir 100 and pump 110 by means including supply duct 60, annular supply reservoir 61 and inlet duct 62. Means are provided by the reservoir for cooling the liquid. The supply duct 60 may extend from the end plate 54 through the sleeves 31 to the collector portions, as shown, or it may extend through the yokes 24 and between the split coils 26 to the annular supply chambers 61 in the collector portions of the sleeves.

The liquid metal is discharged through the inlet ducts 62 to the current collector portions of the air gap and forms an annular ring wetting the surfaces of the rotor at rings 55 and the current collector portions 33 thereby providing an electrical connection between the rotating armature member 12 and the stationary field member 20.

Supply ducts 60 extend from the end plates 54 at both ends of the generator to collector portions 33 of each of sleeves 31. Several such ducts may be positioned circumferentially of the stator to supply the annular supply chambers 61 at several points. Likewise, several inlet ducts 62 may be provided for both collectors radially connecting the supply chambers 61 to the air gap 22.

Annular discharge ducts 65 are formed in the collector portion 33 of the sleeve on both sides of and immediately adjacent to the inlet duct 62. These discharge ducts extend radially to connect the air gap 22 to annular discharge reservoirs 66 which are designed to trap collector fluid entering them. Several return ducts 67 may be provided circumferentially of the sleeve 31 and manifolded to the discharge reservoirs 66. Return ducts 67 connect discharge reservoirs 66 of the collector portion of both sleeves to the external coolers 100 and pumps 110 for recirculation. The annular discharge ducts 65 permit annular or 360 degree discharge of fluid from the current collector portion of the air gap.

In addition to rotor rings 55, the rotor cylinder has helical grooves 56 in its surface adjacent to the rotor rings 55. The grooves on one side of a ring are threaded oppositely to the grooves on the other side so that a predetermined direction of rotation of the rotor causes the collector fluid to be forced axially toward the rotor ring 55 from opposite sides thereof, thus keeping the fluid at the collector portion of the air gap.

Insulation means 70 are provided along the inner surface of the sleeves 30 of the stationary field member 20 except on the current collector portion thereof. This insulation means offers protection against short circuiting between the rotor and the stator in the event liquid metal escapes from the current collector portions of the air gap.

Figure 2:
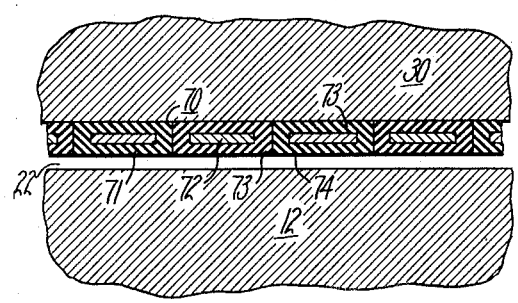
Fig. 2 is an enlarged sectional view of a portion of the insulation shown in Fig. 1.
Figure 3:
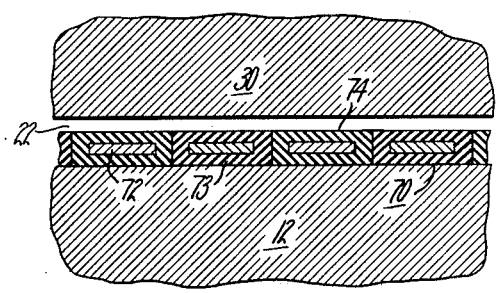
Fig. 3 is an alternate embodiment of the insulation shown in Fig. 1 positioned on the rotor air gap surface.
Figure 4:
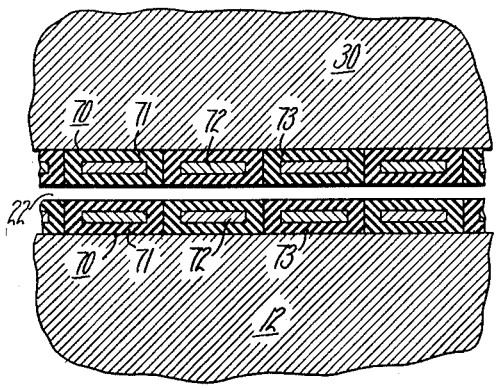
Fig. 4 is an alternate embodiment of the insulation shown in Fig. 1 positioned on both the rotor and stator air gap surfaces.

Insulating means 70 may comprise a plurality of rings or bands 71 positioned side by side on the radially inner surface of the sleeves from the end plates 54 to the collector portions 33, and from the collector portions 33 to the annular plates 40. These rings 71 are preferably generally rectangular in cross section to form a substantially continuous cylindrical surface when positioned on the radially inner surface of the sleeve. The annular rings 71 are shown positioned on the stator surface in Fig. 1 and Fig. 2, however, they may also be positioned on the rotor surface, as shown in Fig. 3, or both the rotor and stator air gap surfaces, as shown in Fig. 4.

The annular rings 71 include a band 72 of magnetic material substantially rectangular in cross section. The band 72 has a coating on the four sides thereof of insulation materials 73 which are compatible with the liquid metal and also with the chemical compounds which may be formed by the interaction of the fluid and other materials surrounding the insulating ring.

The insulation coating 73 for bands 72 may be applied by any suitable means such as dipping or laminating to obtain the desired thickness. The rings 71 are assembled on the inner surface of the sleeve 30 at low temperature and expand firmly in place as the temperature is restored to normal. If the rings are positioned on the rotor, they would be positioned with a shrink fit of the bands 72 to securely hold them on the rotor surface.

Several insulating rings 71 are firmly positioned serially along the surface of the sleeve. The multiple number of annular insulating bands creates a multiple number of series insulators running from one collector to the other and from the collector to the end of the air gap. Radial series insulators are further provided by the annular bands. The portion of the insulation radially outward of the clamping rings is protected from mechanical and chemical injury by the metal clamping rings 61.

Suitable means are provided to seal the joints between adjacent annular insulated rings 71. These means may comprise an additional coating of insulation 74 applied over the inner surface of the insulating rings 71.

As the rotor is turning at a relatively high speed, a small amount of liquid metal vaporizes and some of this liquid metal enters the noncurrent collector portion of the air grip. Means are provided for returning the collector fluid to the external reservoir 100. These means may comprise a flow of gas along the air gap toward the collector portions 33 of the sleeves. Any gas which does not react chemically with the collector fluid, such as nitrogen, may be used.

The gas is supplied to the air gap by means of ducts 76 positioned in end piece 54 and ducts 77 through plates 40 at the center of the machine. The gas flows from the ducts 76 and 77 along the air gap toward the current collector portions 33. Although the gas is shown supplied at the ends and center of the machine, it could be supplied at both ends of the current collector portions 33 of the sleeves 31, if desired. However, when the gas is supplied at the ends and midpoint of the rotor, the gas flows along the surface of the rotor and thus additionally contributes to the cooling of the rotor.

Means are provided by the current collector portions 33 of the sleeves 30 for collecting the gas and any suspended liquid metal carried by the gas. These means comprise annular discharge ducts 80, annular gas discharge reservoirs 81 and discharge ducts 82. Discharge ducts 82 return the gas and any collector fluid carried thereby to the reservoir where the liquid metal is separated from the gas and both the gas and liquid metal are recirculated.

Rotation of the rotor, in conjunction with the radial annuli 80 has been found to produce sufficient gas flow for scavenging purposes without a separate gas blower, although a blower could be added to the gas circulation system if desired.

Separation of liquid metal entrained in the gas is accomplished in reservoir 100 by gravity, condensation or other known separation means.

At rotor standstill the collector fluid returns through drain ducts to an external reservoir. A suitable source of direct current, not shown, is connected to the field coils to energize the coils to produce uniform radial magnetic field in the air gap. The adjacent poles of the independent field structures have the same polarity. The rotor shaft is rotated by suitable known means. Liquid metal is circulated by means of an external pump through ducts 60, annular supply reservoir 61 and inlet duct 62 to the current collector portions of the air gap. The liquid metal is distributed to the current collector portions of the air gap where the fluid conducts current between the rotor rings 55 and the sleeve 30 of the stator.

Insulation 70 on the air gap of sleeve 30 provides protection against short circuits due to any accumulation of stray liquid metal in the noncurrent collector portion of the air gap. As insulation is provided on both the radially inner and outer sides of clamping bands 72, radial series insulation barriers are formed by the annular bands 72 with the portion of the insulation between the bands 72 and the sleeves 30 protected from mechanical and chemical injury. In order for a radial short circuit to occur, a break would have to occur in the insulation on both sides of the clamping bands 72 with sufficient accumulation of liquid metal in the break to conduct current. In order for an axial short circuit to occur, a break would have to occur in the insulation on the air gap side of two adjacent clamping bands and in the insulation between clamping bands with sufficient accumulation of liquid metal to conduct current.

The flow of the current in the sleeves 30 is in an axial direction and is opposite the direction of flow of the current in the armature. The cross flux produced by the current in the sleeves reduces the cross flux produced by the current in the armature thereby keeping magnetic saturation and losses to a minimum. The two collectors connect the armatures for the two fields in series; the voltages generated are in series relation and therefore double voltage is obtained.

The air gap other than the current collector portions is additionally swept free of stray liquid metal by the flow of gas axially along the air gap from both ends of the air gap and from the center of the generator toward the respective current collector portions.

In the embodiment of Fig. 3 the annular bands of insulation 71 are positioned on the cylindrical surface of the rotor 12 by shrinking the insulated metal bands in place. The annular bands are in juxtaposition between two sets of rings 56 and from the rings 56 to the respective ends of the rotor surface.

Figure 5:
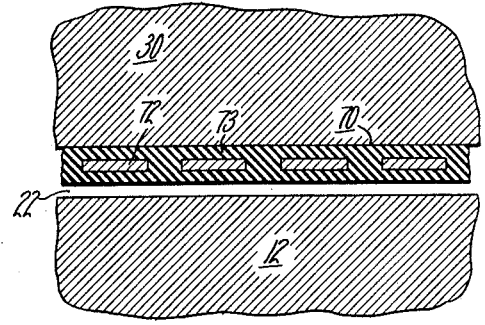
Fig. 5 is an alternate embodiment in which the insulation is molded as a single annular member.

In the embodiment shown in Fig. 4 the insulated bands 71 are applied to both the rotor and sleeve air gap surfaces. In the embodiment shown in Fig. 5 the insulation is shown as a molded unit thereby eliminating all joints. In this embodiment an additional sealing layer is not applied to the outer surface of the insulation.

Other variations or modifications may be made in the embodiments of the invention shown by one skilled in the art without departing from the spirit of the invention or from the scope of the appended claims.

What is claimed is:

1. A unipolar generator comprising an annular stationary field member and a rotatable armature member, said field member comprising field coils and electrically conductive sleeves cooperating with said armature member to form an air gap therebetween, said armature member having current collector portions on the air gap surface thereof, said sleeves including first and second portions of magnetic material forming poles of said field member and including current collector portions between said first and second portions, said sleeve current collector portions being radially aligned with said armature current collector portions, means including said sleeve current collector portions circulating an electrically conductive liquid metal to and from a current collector portion of said air gap between said armature current collector portions and said sleeve current collector portions for conducting current therebetween, insulation means including annular insulation coated bands of magnetic material along one of the surfaces forming said air gap except on said current collector portions thereof providing more than one axial and more than one radial series electrical insulation barrier.

2. A unipolar generator comprising an annular stationary field member and a rotatable armature member, said field member comprising field coils and electrically conductive sleeves cooperating with said armature member to form an air gap therebetween, said armature member having current collector portions on the air gap surface thereof, said sleeves including first and second portions of magnetic material forming poles of said field member and including current collector portions between said first and second portions, said sleeve current collector portions being radially aligned with said armature current collector portions, means including said sleeve current collector portions circulating an electrically conductive liquid metal to and from a current collector portion of said air gap between said rotor current collector portions and said sleeve current collector portions for conducting current therebetween, insulation means along one of the surfaces forming said air gap other than on the current collector portions thereof providing more than one axial and more than one radial series electrical insulation barriers, said insulation means comprising an axial series of annular insulation coated bands of magnetic material.

3. A unipolar generator comprising an annular stationary field member and a rotatable armature member, said field member comprising field coils and electrically conductive sleeves cooperating with said armature member to form an air gap therebetween, said armature member having current collector portions on the air gap surface thereof, said sleeves including first and second portions of magnetic material forming poles of said field member and including current collector portions between said first and second portions, said sleeve current collector portions being radially aligned with said armature current collector portions, means including said sleeve current collector portions circulating an electrically conductive liquid metal to and from a current collector portion of said air gap between said armature current collector portions and said sleeve current collector portions for conducting current therebetween, insulation means along the air gap surface of said rotor except on the current collector portions thereof providing more than one axial and more than one radial series electrical insulation barrier, said insulation means comprising an axial series of annular insulation coated bands of magnetic material.

4. A unipolar generator comprising an annular stationary field member and a rotatable armature member, said field member comprising field coils and electrically conductive sleeves cooperating with said armature to form an air gap therebetween, said armature member having current collector portions on the air gap surface thereof, said sleeves including first and second portions of magnetic material forming poles of said field member and including current collector portions between said first and second portions, said sleeve current collector portions being radially aligned with said armature current collector portions, means including said sleeve current collector portions circulating an electrically conductive liquid metal to and from a current collector portion of said air gap between said armature current collector portions and said sleeve current collector portions for conducting current therebetween, insulation means along the air gap surface of said sleeves except on the current collector portions thereof providing more than one axial and more than one radial series electrical insulation barrier, said insulation means comprising an axial series of annular insulation coated bands of magnetic material.

5. A unipolar generator comprising an annular stationary field member and a rotatable armature member, said field member comprising field coils and electrically conductive sleeves cooperating with said armature to form an air gap therebetween, said armature member having current collector portions on the air gap surface thereof, said sleeves including first and second portions of magnetic material forming poles of said field member and including current collector portions between said first and second portions, said sleeve current collector portions being radially aligned with said armature current collector portions, means including said sleeve current collector portions circulating an electrically conductive liquid metal to and from a current collector portion of said air gap between said armature current collector portions and said sleeve current collector portions for conducting current therebetween, insulation means comprising juxtapositioned annular insulation coated bands of magnetic material along one of the surfaces forming said air gap except on said current collector portions thereof to provide more than one axial and more than one radial series electrical insulation barrier.

6. A unipolar generator comprising an annular stationary field member and a rotatable armature member, said field member comprising field coils and electrically conductive sleeves cooperating with said armature to form an air gap therebetween, said armature having current collector portions on the air gap surface thereof, said sleeves including first and second portions of magnetic material forming poles of said field member and including current collector portions between said first and second portions, said sleeve current collector portions being radially aligned with said armature current collector portions, means including said sleeve current collector portions supplying an electrically conductive liquid metal to a current collector portion of said air gap between said armature current collector portions and said sleeve current collector portions for conducting current therebetween, insulation means comprising juxtapositioned annular insulation coated bands of magnetic material along one of the surfaces forming said air gap except on said current collector portions thereof to provide more than one axial and more than one radial series electrical insulation barriers, and means sealing joints between adjacent insulated bands.

7. A unipolar generator comprising an annular stationary field member and a rotatable armature member, said field member comprising field coils and electrically conductive sleeves cooperating with said armature to form an air gap therebetween, said armature member having current collector portions on the air gap surface thereof, said sleeves including first and second portions of magnetic material forming poles of said field member and including current collector portions between said first and second portions, said sleeve current collector portions being axially aligned with said armature current collector portions, means including said sleeve current collector portions supplying an electrically conductive liquid metal to and from a current collector portion of said air gap between said armature current collector portions and said sleeve current collector portions for conducting current therebetween, insulation means providing more than one axial and more than one radial series electrical insulation barrier along one of the surfaces forming said air gap except on said current collector portion thereof, said insulation means comprising annular molded insulation including bands of magnetic material positioned therein.

References Cited in the file of this patent

UNITED STATES PATENTS

| | | |
|---|---|---|
| 1,184,224 | Breslauer | May 23, 1916 |
| 2,753,476 | Watt | July 3, 1956 |
| 2,786,155 | Sellers | Mar. 19, 1957 |